June 18, 1963
H. D. KESLING
3,093,903
PIN AND SPRING FOR LIGHT WIRE BRACKET
Filed March 30, 1961
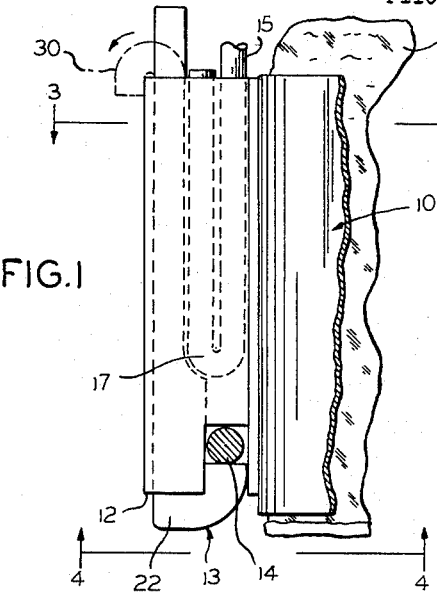
FIG.1
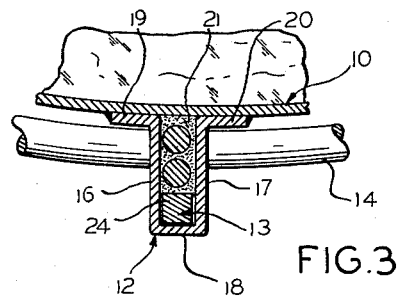
FIG.3
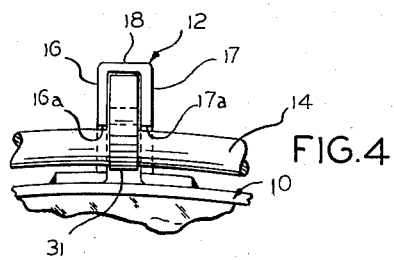
FIG.4
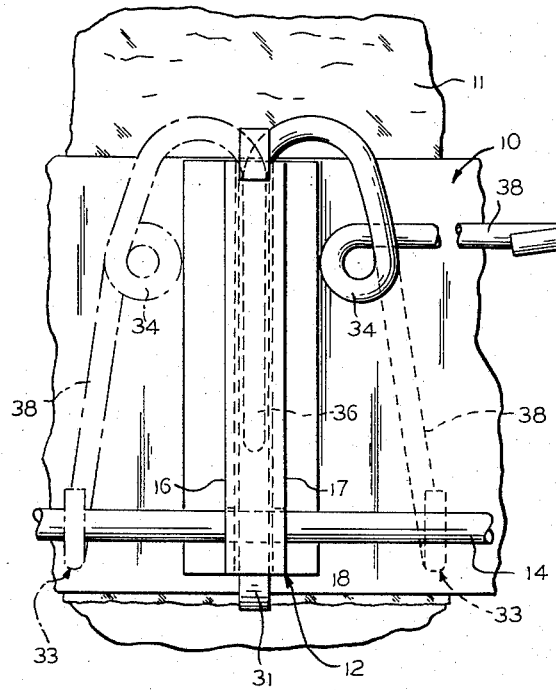
FIG.2
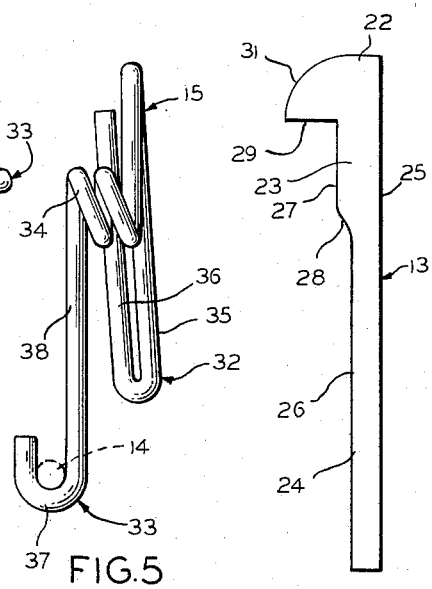
FIG.5
FIG.6
*INVENTOR.*
HAROLD D. KESLING
BY Marzall, Johnston, Cook + Root
ATTORNEYS United States Patent Office 3,093,903
Patented June 18, 1963

3,093,903
PIN AND SPRING FOR LIGHT WIRE BRACKET
Harold D. Kesling, R.R. 2, La Porte, Ind.
Filed Mar. 30, 1961, Ser. No. 99,562
4 Claims. (Cl. 32—14)

This invention relates in general to an orthodontic appliance for use in the straightening of teeth, and particularly to an orthodontic appliance including a pin and spring for a light wire bracket wherein it is desired to connect an arch wire to a tooth and apply tipping forces thereto.

In the straightening of teeth, it is often necessary to align the teeth in an erect position which necessitates application of torquing or tipping forces to a tooth. The present invention involves the mounting of a bracket on a tooth band, wherein the tooth band has been cemented or suitably secured to a tooth and between the gingival and occlusal ends thereof. The bracket is channel-shaped and positioned on the tooth band at the labial or buccal side thereof and between the mesial and distal sides of the tooth. Further, the bracket, being elongated, has its longitudinal axis extending substantially parallel to the tooth axis in the gingival-occlusal direction. Notches are provided in the bracket at the gingival or occlusal ends thereof and adjacent to the tooth band for receiving the arch wire. A lock pin is provided to be received in the channel-shaped bracket and to lock the wire to the bracket. A head is provided on the pin to coact with the notches in the bracket to confine the wire in an opening defined by the pin and bracket. The pin is elongated and of a length greater than the length of the bracket so that the end opposite the head may be bent over the occlusal or gingival end of the bracket to securely lock the pin in position. The end of the pin opposite the head is sized to permit an opening to be defined at the opposite end of the bracket to receive one end of a tipping spring. This end may be suitably cemented or forced in the bracket to anchor it thereto. A coil is provided in the spring and the other end includes a bent back portion defining a hook that may be positioned about the arch wire and essentially hooked thereto to thereby provide a tipping force to be applied to the tooth.

Heretofore, lock pins were not constructed in such a manner as to permit the additional anchoring of a tipping spring to a bracket containing such a lock pin. The present invention has overcome this difficulty in sizing the end opposite the head of the lock pin so as to now permit a tipping spring to be combined with the bracket and lock pin and increase the usefulness and effectiveness of the appliance.

Accordingly, it is an object of this invention to provide an improved orthodontic appliance for use in the straightening of teeth.

Another object of this invention is in the provision of an orthodontic appliance for use in the straightening of teeth, wherein the appliance includes a bracket and lock pin assembly that is capable of additionally anchoring one end of a tipping spring to the bracket to thereby permit the application of tipping forces to a tooth.

Still another object of this invention resides in the provision of an improved lock pin for use in combination with brackets in orthodontic appliances, wherein the lock pin is capable of securing an arch wire to a bracket and additionally permitting the securing of one end of a tipping spring to the bracket.

A still further object of this invention is to provide an orthodontic appliance including a band attachable to a tooth, a bracket secured to the band, an arch wire arranged adjacent to the bracket and in notches formed at one end of the bracket, a lock pin for securing the wire to the bracket, and a tipping spring adapted to have one end secured to the bracket and the other end connected to the arch wire for applying a tipping force on the tooth.

Other objects, features and advantages of the invention will be apparent from the following detailed disclosure, taken in conjunction with the accompanying sheet of drawing, wherein like reference numerals refer to like parts, in which:

FIG. 1 is a side elevational view of the bracket and pin assembly illustrated and positioned on a tooth band mounted on a tooth with the tooth band and tooth being fragmentary, and also illustrating the anchoring end of a tipping spring as secured to the bracket;

FIG. 2 is a front elevational view of the bracket pin and spring assembly illustrated in FIG. 1 and showing in dotted lines an alternate position for the spring;

FIG. 3 is a transverse sectional view taken substantially along line 3—3 of FIG. 1;

FIG. 4 is a bottom plan view of the bracket and pin taken along line 4—4 of FIG. 1;

FIG. 5 is a side elevational view of a tipping spring used in the orthodontic appliance of the present invention; and FIG. 6 is a side elevational view of a lock pin in accordance with the present invention.

Referring now to the drawings, the particular construction herein shown for purposes of illustrating the invention includes generally a tooth band 10 mounted on a tooth 11, a bracket 12 suitably secured to the tooth band 10, a lock pin or spike 13 in assembled relation with the bracket 12 to secure an arch wire 15 thereto, and a tipping spring 15 for utilization with the bracket and arch wire to apply a tipping force to the tooth.

The band 10 is secured to a tooth in the usual manner between the occlusal and gingival ends thereof and by cementing or other suitable means. The full details of a tooth construction and band construction are omitted for purposes of clarification, but it will be appreciated that the band 10 circumscribes the tooth in the usual manner. The bracket 12 is suitably secured to the tooth band as by soldering and/or spot welding and positioned on the labial or buccal side of the tooth and between the mesial and distal sides thereof.

As seen in FIGS. 1 and 2, the bracket 12 is elongated wherein its longitudinal axis substantially parallels the axis of the tooth 11 in the occlusal-gingival direction. Further, the bracket 12 is channel-shaped or U-shaped in cross section and substantially rectangularly shaped wherein it includes opposed upstanding parallel walls 16 and 17 connected together at the labial or buccal ends thereof by an end wall 18 and provided at the band or lingual ends or edges with flanges 19 and 20 intimately engaging the buccal or labial face of the band 10, thereby defining a substantially rectangular opening 21 extending through the bracket 12. Essentially, the bracket may be considered hollow. At one end of the bracket 12, notches 16a and 17a are provided in the walls 16 and 17. These notches are aligned with each other and at the band ends of the walls 16 and 17 for defining an arch wire receiving opening in the bracket. Actually the notches of the walls 16 and 17 extend between the buccal or labial sides of the flanges 19 and 20 to points spaced therefrom to define the notches as being slightly larger than the maximum cross-sectional dimension of the arch wire 14. It should also be appreciated that the connecting wall 18 extends substantially parallel to the band 10, although the connecting wall may not be flat as shown but may be arcuately formed. The notched end of the bracket may be positioned gingivally or occlusally of the tooth.

The lock pin 13 is dimensioned to have a length greater than the longitudinal dimension of the bracket 12, and includes a head 22 at one end thereof, a reduced body portion 23 beneath the head, FIG. 6, and a still further reduced and elongated body section or tail 24 beneath the body section 23. The head 22, body section 23 and body section 24 are bound along the buccal or labial side of the pin by a continuous straight edge 25, while the band side of the reduced section 24 is defined by the straight edge 26 and the band side of the reduced section 23 is defined by the straight edge 27. The faces 26 and 27 are joined at their respective adjacent ends by an intermediate face 28. An edge 29 defines the one side of the head 22 that engages the arch wire and extends substantially perpendicularly to the face 27 of the reduced portion 23 to define therebetween a cutout on the pin for coacting with the notches 16a and 17a of the bracket 12 to lock the arch wire 14 to the bracket. To secure the pin in position on the bracket, the small or tail end is bent over at 30 against the bracket 12 as seen particularly in FIG. 1. While the end of the pin is shown as being bent over the connecting wall 18, it will be appreciated that it can also be bent over the opposed side walls 16 or 17. As may be noted in FIG. 3, the reduced section 24 is substantially square in cross section and provides a considerable opening at the corresponding end of the bracket in not occupying the entire opening 21 thereof. The band side 31, FIGS. 4 and 6, of the pin 13 approximately coincides with the band edges of the notches 16a and 17a to fully and completely lock the arch wire 14 in place, while the labial or buccal face 25 of the pin bears against the band side of the connecting wall 18 of the bracket 12. Preferably, the pin is constructed of stainless steel, although any other suitable material may be used.

In order to better understand the pin construction and its association with the bracket, an actual example of the dimensions of the pin and associated structure will be given. The length of the pin prior to mounting would be approximately .300 of an inch, although the length may be shortened if desired depending upon the length of the bracket. The mesial-distal width of the pin would be approximately .014 which would additionally mean that the buccal-band side of the reduced section 24 would also be .014. The buccal-band width of the reduced section 23 would be .025, while the buccal-band width of the pin head would be .050. Additionally, the length or other dimension of the head would be .030, while the length of the face 27 would be .040, and the buccal-band length of the face 29 would be .017. This pin would be constructed for use with light wire having a .016 inch diameter. The interior dimension of the bracket 12 would be approximately .017, while the distance between the buccal side of the band 10 and the band side of the connecting wall 18 would be approximately .050 or equal to the buccal-band width of the head. Accordingly, there would remain, after the pin has been inserted and secured in position, an opening accessible from the end of the bracket 12 opposite the pin head having a buccal-band dimension equal to approximately .035 and a full depth to the merging face 28 between the faces 26 and 27 of the reduced sections 24 and 23, respectively.

This opening along the small end of the pin in the bracket is large enough to receive the anchoring end 32 of the tipping spring 15, while the arch wire end 33 of the spring may be connected to the arch wire 14. The tipping spring 15 further includes a coil portion 34 arranged between the anchoring end 32 and the arch wire end 33. Any number of coils may be provided depending upon the particular installation. The anchoring end 32 is defined by a leg 35 coming off one end of the coil 34 and bent back at 36 to provide a strong and durable end which is sized to be received in the open end of the bracket as seen in the drawings. This anchoring end may be suitably shimmed in tight engagement with the bracket and pin or cemented in position depending upon the desires of the user. The arch wire end 33 of the spring is defined by a hook portion 37 extending from a leg 38 which connects to the other end of the coil 34. The hooked portion 37 is dimensioned to hook onto and be coupled to the arch wire 14. As seen in FIG. 2, the spring 15 is shown in solid lines on one side of the bracket 12 and in dotted lines on the other side of the bracket, this positioning depending upon the particular tipping force desired to be applied to the tooth. The tipping spring 15 shown in solid lines in FIG. 2 is tensioned when properly connected to the bracket and the arch wire to apply a tipping force or torquing force to rotate the tooth in a clockwise direction, while if it is desired to rotate the tooth in a counterclockwise direction the tipping spring shown in dotted lines would be utilized. It should be appreciated that the tipping spring used on one side is the opposite from the tipping spring used on the other side, and in each case the coil 34 is essentially arranged between the band side of the leg 38 and the buccal side of the leg 35.

From the foregoing, it is seen that the present invention provides an orthodontic appliance including a combination lock pin and bracket assembly so constructed as to enable the additional efficient and easy use of a tipping spring in combination therewith.

It will be understood that modifications and variations may be effected without departing from the scope of the novel concepts of the present invention, but it is understood that this application is to be limited only by the scope of the appended claims.

The invention is hereby claimed as follows:

1. An orthodontic appliance comprising a tooth band adapted to be mounted on a tooth, an elongated U-shaped in cross section bracket secured to the buccal side of the band and having its longitudinal axis extending gingival-occlusally, said bracket coacting with said band to define an elongated tubular opening, a notch at one end of said bracket and at the lingual side thereof to define an arch wire receiving socket extending mesial-distally, an arch wire received in said socket, a lock pin received in said tubular opening and having a head on one end closing said arch wire receiving socket thereby locking the arch wire to the bracket, said lock pin having a length greater than the longitudinal length of said bracket and having its end opposite the head bent over the other end of the bracket and thereby securing the pin to the bracket, the head of said lock pin having a buccal-lingual depth substantially equal to the buccal-lingual depth of said tubular opening, said lock pin including a first reduced section adjacent to said head having a buccal-lingual depth such as to define with said lingual side of said bracket a buccal-lingual space slightly greater than the buccal-lingual depth of said arch wire and a second reduced section adjacent to said first reduced section and having a buccal-lingual depth substantially equal to its mesial-distal depth thereby defining with the bracket a reduced tubular opening at the end opposite the notched end thereof, and a tipping spring having a coil portion, an anchoring end extending from one end of the coil portion and received in said reduced tubular opening, and an arch wire hook end extending from the other end of said coil and connecting with the arch wire under tension laterally of said bracket thereby exerting a tipping force to the tooth through the bracket and band.

2. A lock pin for use with an orthodontic bracket having an elongated tubular opening of substantially uniform cross section to secure an arch wire to said bracket, said pin comprising a head having a buccal-lingual depth substantially equal to the buccal-lingual depth of said opening, a first reduced section adjacent to the head having a buccal-lingual depth such as to define with said lingual side of said bracket a buccal-lingual space slightly greater than the buccal-lingual depth of said arch wire, and a second reduced section adjacent to the first reduced section having a buccal-lingual depth substantially equal to the mesial-distal depth of said pin and substantially less than the buccal-lingual depth of said first reduced section to define a tubular opening at one end of said bracket having a substantial buccal-lingual depth.

3. An orthodontic appliance comprising a tooth band adapted to be mounted on a tooth, an elongated U-shaped in cross section bracket secured to the buccal side of the band and having its longitudinal axis extending gingival-occlusally, said bracket coacting with said band to define an elongated tubular opening, a notch at one end of said bracket and at the lingual side thereof to define an arch wire receiving socket extending mesial-distally, an arch wire received in said socket, and a lock pin received in said tubular opening for locking the arch wire to said bracket, said lock pin comprising a head having a buccal-lingual depth substantially equal to the buccal-lingual depth of said opening, a first reduced section adjacent to the head having a buccal-lingual depth such as to define with said lingual side of said bracket a buccal-lingual space slightly greater than the buccal-lingual depth of said arch wire, and a second reduced section adjacent the first reduced section having a buccal-lingual depth substantially equal to the mesial-distal depth of said pin and substantially less than the buccal-lingual depth of said first reduced section to define a tubular opening at the other end of said bracket having a substantial buccal-lingual depth.

4. An orthodontic appliance comprising a tooth band adapted to be mounted on a tooth, an elongated U-shaped in cross section bracket secured to the buccal side of the band and having its longitudinal axis extending gingival-occlusally, said bracket coacting with said band to define an elongated tubular opening, a notch at one end of said bracket and at the lingual side thereof to define an arch wire receiving socket extending mesial-distally, an arch wire received in said socket, and a lock pin received in said tubular opening for locking the arch wire to said bracket, said pin being elongated and having a longitudinal length greater than the longitudinal length of the bracket and comprising a head having a buccal-lingual depth substantially equal to the buccal-lingual depth of said opening, a first reduced section adjacent to the head having a buccal-lingual depth such as to define with said lingual side of said bracket a buccal-lingual space slightly greater than the buccal-lingual depth of said arch wire, and a second reduced section adjacent the first reduced section having a buccal-lingual depth substantially equal to the mesial-distal depth of said pin and substantially less than the buccal-lingual depth of said first reduced section to define a tubular opening at the other end of said bracket having a substantial buccal-lingual depth, and the second reduced section of said pin being bent over said other end of said bracket thereby securing the pin thereto.

References Cited in the file of this patent
UNITED STATES PATENTS

| | | |
|---|---|---|
| 1,821,171 | Atkinson | Sept. 1, 1931 |
| 2,196,516 | Atkinson | Apr. 9, 1940 |